United States Patent
Watts

(10) Patent No.: US 11,438,376 B2
(45) Date of Patent: Sep. 6, 2022

(54) PROBLEMATIC AUTONOMOUS SYSTEM ROUTING DETECTION

(71) Applicant: T-Mobile USA, Inc., Bellevue, WA (US)

(72) Inventor: Andrew Watts, Seattle, WA (US)

(73) Assignee: T-Mobile USA Inc., Bellevue, WA (US)

( * ) Notice: Subject to any disclaimer, the term of this patent is extended or adjusted under 35 U.S.C. 154(b) by 399 days.

(21) Appl. No.: 16/696,634

(22) Filed: Nov. 26, 2019

(65) Prior Publication Data

US 2021/0160279 A1 May 27, 2021

(51) Int. Cl.
*H04L 29/06* (2006.01)
*H04L 9/40* (2022.01)
*H04L 45/302* (2022.01)
*H04L 45/02* (2022.01)
*H04L 45/00* (2022.01)
*H04L 45/021* (2022.01)

(52) U.S. Cl.
CPC ........ *H04L 63/1475* (2013.01); *H04L 45/021* (2013.01); *H04L 45/08* (2013.01); *H04L 45/22* (2013.01); *H04L 45/304* (2013.01); *H04L 63/1425* (2013.01); *H04L 63/20* (2013.01)

(58) Field of Classification Search
CPC ....... H04L 45/021; H04L 45/08; H04L 45/22; H04L 45/304; H04L 63/1425; H04L 63/20

See application file for complete search history.

(56) References Cited

U.S. PATENT DOCUMENTS 7,584,298 B2 * 9/2009 Klinker .................. H04L 45/70 709/239
7,823,202 B1 * 10/2010 Nucci ................. H04L 63/1408 709/224

(Continued)

FOREIGN PATENT DOCUMENTS

CN 102045237 A * 5/2011 ............. H04L 45/04

OTHER PUBLICATIONS

B. Al-Musawi, P. Branch and G. Armitage, "BGP Anomaly Detection Techniques: A Survey," in IEEE Communications Surveys & Tutorials, vol. 19, No. 1, pp. 377-396, Firstquarter 2017, doi: 10.1109/COMST.2016.2622240. (Year: 2017).*

(Continued)

*Primary Examiner* — Shawnchoy Rahman
(74) *Attorney, Agent, or Firm* — Han Santos, PLLC

(57) ABSTRACT

An Autonomous System (AS) may receive an AS route update from a remote AS at an isolated border gateway (BGW) router of an AS. The AS may analyze a data traffic routing path in the AS route update to determine whether the AS route update is a problematic update, the data traffic routing path for routing data traffic through a plurality of ASs that include the AS. In response to determining that the AS route update is a non-problematic update, the AS may implement the AS route update into the one or more operational BGW routers of the AS to route the data traffic between the plurality of ASs. In response to determining that the AS route update is a problematic update, the AS may designate the AS route update from the remote AS as unsuitable for implementation into one or more operational BGW routers of the AS.

20 Claims, 5 Drawing Sheets

(56) References Cited

U.S. PATENT DOCUMENTS 8,014,399 B2 *  9/2011  He ................... H04L 45/06
                                                370/395.31
8,141,156 B1 *  3/2012  Mao ................. H04L 45/021
                                                709/224

OTHER PUBLICATIONS

S. Rai, B. Mukherjee and O. Deshpande, "IP resilience within an autonomous system: current approaches, challenges, and future directions," in IEEE Communications Magazine, vol. 43, No. 10, pp. 142-149, Oct. 2005, doi: 10.1109/MCOM.2005.1522138. (Year: 2005).*

Feamster, Nick, and Hari Balakrishnan. "Detecting BGP configuration faults with static analysis." Proceedings of the 2nd conference on Symposium on Networked Systems Design & Implementation—vol. 2. 2005. (Year: 2005).*

* cited by examiner

PROBLEMATIC AUTONOMOUS SYSTEM ROUTING DETECTION

BACKGROUND

An Autonomous System (AS) is a very large heterogeneous network of specific IP addresses. ASs are administrated by various entities, such as Internet Service Providers (ISPs), wireless carrier networks, and even nation states. ASs relay data traffic to each other in a way that makes data communications via the Internet possible. The routers of ASs that route data traffic between ASss are called border gateway (BGW) routers, such routers may be managed using the Border Gateway Protocol (BGP).

The BGW routers of an AS are designed to accept AS route updates from the BGW routers of other ASs. An AS route update may change a routing path that data traffic takes between ASs. For example, an original routing path may be AS1-AS2-AS3, in which AS1 is the originating AS, AS2 is the intermediate AS, and AS3 is the destination AS. However, the AS route update may change the routing path to AS1-AS4-AS3, in which AS4 replaces AS2 as the intermediate AS. An AS may provide an AS route update to other ASs for legitimate purposes, such as re-routing data traffic to bypass network congesting points or AS outages. However, an AS under the control of a malicious actor can also purposely use an AS route update to embed itself into a data traffic routing path in order to blackhole, intercept, or duplicate the data traffic for nefarious reasons. Further, AS route updates provided by ASs are also susceptible to misconfigurations, which can result in suboptimal data traffic routing paths.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 5 is a flow diagram of an example process for performing various remedial actions when a remote AS is determined to be a problematic AS.

DETAILED DESCRIPTION

Figure 1:
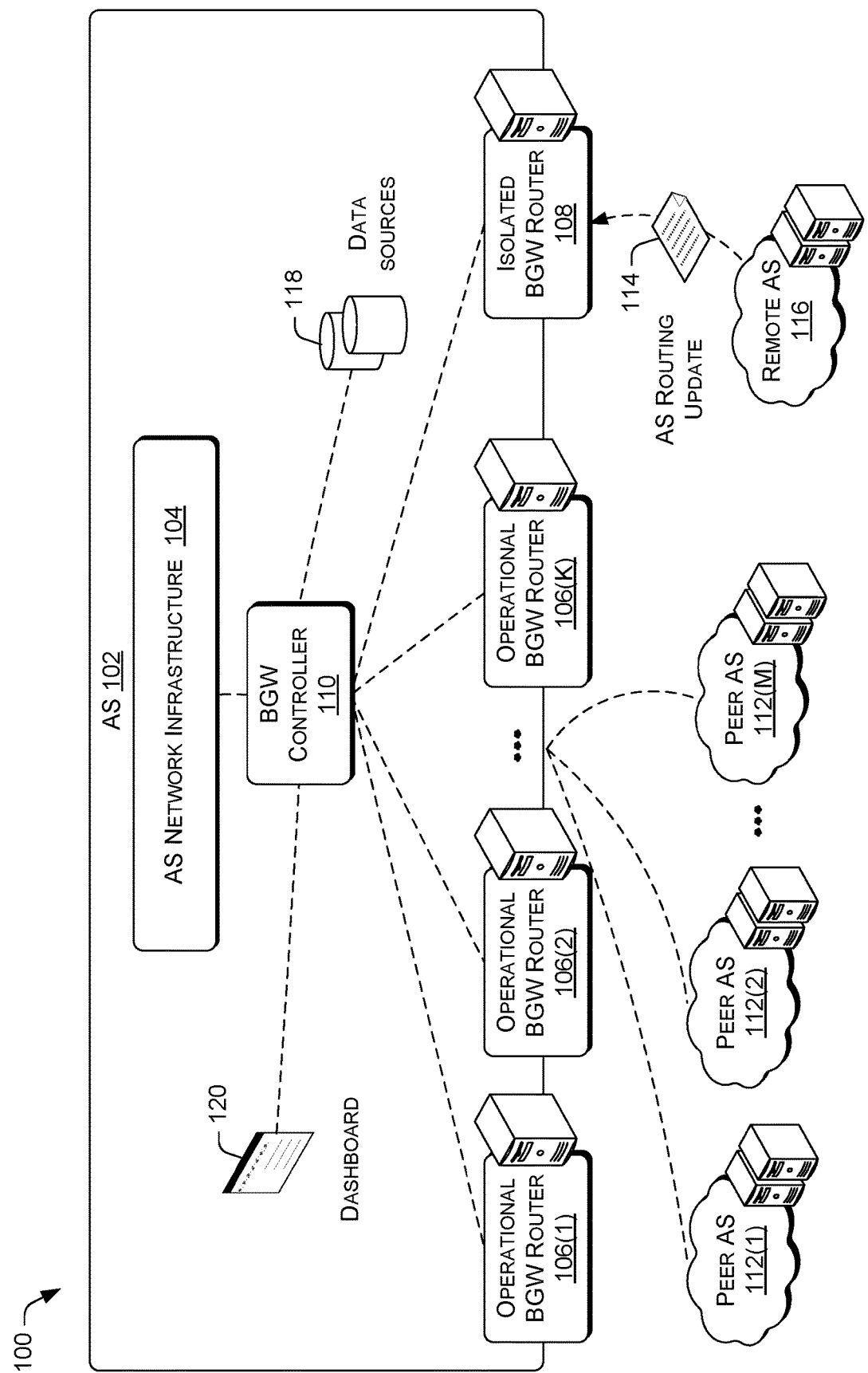
FIG. 1 illustrates an example architecture of an autonomous system (AS) that supports the detection of problematic AS route updates.

This disclosure is directed to techniques that enable an autonomous system (AS) to use an isolated border gateway (BGW) router, also referred to as a honeypot gateway router, to detect problematic AS route updates that the AS receives from other ASs. An AS route update may change a routing path that data traffic takes between ASs. The problematic AS route updates may include a nefarious routing update or a misconfigured routing update. The nefarious routing update may be configured by a malicious party to embed its AS into a data traffic routing path for the purpose of intercept, blackhole, or duplicate data traffic. The misconfigured routing update may simply be a routing error made by an innocent actor that results in a suboptimal data traffic routing path. Unlike an operational BGW router of the AS, the isolated BGW router is a BGW router that is not configured to participate in the routing of data traffic between the AS and other ASs. Instead, the isolated BGW router is configured to receive AS route updates from other ASs and send the AS route updates to a BGW controller for analysis. In some instances, the isolated BGW router may be purposely configured with known vulnerabilities, e.g., vulnerable security settings, software bugs, etc. that are attractive to malicious actors.

In various embodiments, the BGW controller may analyze an AS route update that the isolated BGW router receives from a remote AS to determine whether the AS route update is a problematic update. The analysis techniques that are employed by the BGW controller may include network topology analysis, pattern matching analysis, statistical analysis, and/or so forth. For example, the BGW controller may determine that an AS route update is problematic when the analysis indicates that the AS route update contains a malicious hairpin routing configuration that enables a corresponding remote AS to intercept, blackhole, or duplicate data traffic. In another example, the BGW controller may determine that the AS route update is problematic when the analysis indicates that the data traffic routing proposed by the AS route update negatively impacts network performance metrics that are guaranteed by the AS.

Accordingly, the BGW controller may deploy an AS route update from the remote AS to one or more operational BGW routers of the AS when the AS route update is not determined to be problematic. On the other hand, if the AS route update from the remote AS is determined by the BGW controller to be problematic, the BGW controller may designate the AS route update as being unsuitable for deployment into the one or more operational BGW routers of the AS.

In some embodiments, the BGW controller of the AS may take one or more actions against a remote AS that recurrently surfaces problematic AS route updates to the AS. In one instance, the AS may prune the remote AS from one or more data traffic routing paths used by the AS by passing the data traffic through one or more alternative ASs. In another instance, the AS may exclude the remote AS from future data traffic routing paths generated by the AS for promulgation to peer ASs. In additional instances, the AS may report the remote AS as a problematic AS to one or more peer ASs or a governmental entity.

The use of an isolated BGW router enables an AS to determine whether an AS route update received from a remote AS is problematic prior to implementing the routing data into operation. Accordingly, the use of the isolated BGW router may protect the AS from malicious or erroneous routing path configurations that cause network performance degradation and outages. Example implementations are provided below with reference to the following FIGS. 1-5.

Example Environment Architecture

FIG. 1 illustrates an example architecture 100 of an AS 102 that supports the detection of problematic AS route updates. The autonomous system 102 may include AS network infrastructure 104, operational BGW routers 106 (1)-106(K), an isolated BGW router 108, and a BGW controller 110. The AS network infrastructure 104 may include internal subnetworks that share common routing logics and policies. For example, the internal subnetworks of the AS network infrastructure 104 may use a set of IP routing prefixes that are under the control of a single administrative entity and/or domain.

The operational BGW routers 106(1)-106(K) are responsible for routing data traffic between the AS 102 and one or more other ASs, such as the peer ASs 112(1)-112(M). In other words, the BGW routers 106(1)-106(K) are used by the AS 102 to exchange data traffic with the other ASs. For example, the BGW routers 106(1)-106(K) may enable the AS 102 to communicate with the peer ASs 112(1)-112(M) via the Border Gateway Protocol (BGP). The isolated BGW router 106 of the AS 102 is not configured to participate in the routing of data traffic between the AS and the other ASs. Instead, the isolate BGW router 106 is configured to receive AS route updates from the BGW routers of other ASs. The AS route updates are then passed from the isolated BGW router 106 to the BGW controller 110. An AS route update may change a routing path that data traffic takes between ASs by at least one of removing one or more ASs used in an existing data traffic routing path or adding one or more ASs to the existing data traffic routing path. For example, an original routing path may be AS1-AS2-AS3, in which AS1 is the originating AS, AS2 is the intermediate AS, and AS3 is the destination AS. However, the AS route update may change the routing path to AS1-AS4-AS3, in which AS4 replaces AS2 as the intermediate AS. In some instances, the isolated BGW router 106 may be purposely configured with known vulnerabilities, e.g., vulnerable security settings, software bugs, etc. that make the BGW router 106 an attractive target to malicious actors, such as malicious actors that control other ASs. Conversely, the operational BGW routers 106(1)-106(K) of the AS 102 are configured to not directly accept AS route updates from other ASs.

The BGW controller 110 may analyze the AS route updates that are provided by the isolated BGW router 106 to determine whether they are problematic AS route updates. For example, the BGW controller 110 may analyze an AS route update 114 that is provided by a remote AS 116. In some instances, a problematic AS route update may include a malicious data traffic routing path configuration that is set up by a remote AS. In other instances, a problematic AS route update may include an unintentional misconfiguration of a data traffic routing path that degrades network performance metrics of the AS 102. The analysis techniques that are employed by the BGW controller 110 may include network topology analysis, pattern matching analysis, statistical analysis, and/or so forth. Some of these analysis techniques may include the use of machine learning or artificial intelligence (AI) algorithms.

In some embodiments, the BGW controller 110 may access data from one or more data sources 118 to analyze AS route updates. The data sources 118 may include internal databases that are maintained by the BGW controller 110 and third-party external databases. For example, the data sources 118 may include a database that tracks the operation cost incurred by the AS 102 for routing data traffic to different ASs and/or through various Alternative Access Vendors (AAVs) that connect the ASs. An additional database may track the key performance metrics (KPIs) associated with different data traffic routing paths or routing path segments between multiple ASs. A routing path segment refers to a data traffic path between two corresponding ASs. For example, the KPIs may include a data throughput measurement, a response latency measurement, a maximum allowable data packet loss measurement, etc. The database may also contain the minimal KPI requirements that the AS 102 has guaranteed to various customers of the AS 102 under corresponding service level agreements (SLAs). An additional database may store historical problematic routing path data that tracks data traffic routing paths or routing path segments of the data traffic paths that have been previously identified as problematic by the BGW controller 110.

Accordingly, the BGW controller 110 may use the data from one or more internal databases to determine whether a particular AS route update is valid or problematic. For example, the BGW controller 110 may generate a simulation of the data traffic routing path specified by the particular AS route update based on the data to predict whether the AS route update is valid. In some instance, the BGW controller 110 may determine that a particular AS route update is valid when a prediction based on the data indicates that a data traffic routing path of the particular AS route update does not drop a set of one or more KPIs below a corresponding set of one or more KPI requirements. In another instance, the BGW controller 110 may determine that a particular AS route update is valid when a prediction based on the data indicates that (1) the particular AS route update does not drop a set of one or more KPIs below a corresponding set of one or more KPI requirements and (2) the data traffic routing path of the particular AS route update results in equal or less operation cost than an existing data traffic routing path being replaced.

However, in some embodiments, the one or more databases may contain insufficient data for the BGW controller 110 to make a prediction for the particular routing update. For example, the BGW controller 110 may be unable to predict the impact of the particular AS route update on KPIs and/or operation cost. In such embodiments, the BGW controller 110 may initiate a trial implementation of the AS route update on an operational BGW router, such as the BGW router 106(1), for a limited amount of time. The trial implementation may provide the BGW controller 110 with sufficient information to determine whether a set of one or more KPIs for the data traffic routing path of the particular AS route update meets a corresponding set of one or more minimal KPI requirements and/or an operation cost target.

In an additional example, the BGW controller 110 may use pattern matching to identify problematic AS route updates based on the historical problematic routing path data. In such an example, the BGW controller 110 may determine that a particular AS route update is problematic when the particular AS route update contains a data traffic routing path or a routing path segment that is previously known to be problematic.

The data sources 118 may further provide data regarding the network topology of multiple ASs and the network connections between the ASs. Such data may include hardware information (e.g., copper vs. fiber optics, router type, etc.), software information (e.g., router port settings, domain name server (DNS) settings, router software version number, etc.), and/or topology information (e.g., redundant links, distance between nodes, network component locations, AS connection configurations, etc.). The data sources 118 may additionally provide real-time operational statuses of the ASs and/or network links between the ASs. Such status information may include trouble ticket reports, network component error logs and reports, network sensor data, AS status reports, news reports, social media reports, and/or so forth that are collected from multiple sources. Accordingly, the BGW controller 110 may use such data to identify a particular AS route update as valid or problematic. For example, a topology analysis of an AS route update provided by an AS may identify a corresponding data traffic routing path as routing traffic to the AS in a suboptimal fashion. In such an example, the existing routing path may be AS1 to AS2, while an updated routing path may be AS1-AS3-AS2 that increases the distance of the routing path and data latency.

Accordingly, the BGW controller 110 may determine the particular AS route update as problematic based on the topology analysis. In another example, network topology information from a trusted data source (e.g., a governmental agency, a private regulatory body, etc.) may also identify ASs as being operated by known malicious actors, i.e., malicious ASs. Thus, a data traffic routing path or a routing path segment may be determined by the BGW controller 110 to be problematic because it passes through one or more such ASs. This is because the corresponding AS route update is likely to be configured to allow at least one malicious AS to blackhole, intercept, and/or duplicate the data traffic passing through the malicious AS.

However, the BGW controller 110 may determine that the particular AS route update is valid when additional data from the data sources 118 indicates that the network link of a current data traffic routing path between a first AS and a second AS, or that an AS itself, is experiencing an outage, i.e., is out-of-service. For example, the data may indicate that a fiber optics communication link between the first AS and the second AS has been severed, thereby necessitating the rerouting of the data traffic via a third AS. In another example, the data may indicate that an AS has failed, thereby necessitating the rerouting of the data traffic through another AS. In various embodiments, the BGW controller 116 may make such determination based on simulations of data traffic between the ASs using the topology and operational status data.

The BGW controller 110 may deploy an AS route update received from a remote AS to the operational BGW routers, such as the operational BGW routers 106(1)-106(K), following a determination that the AS route update is valid. The AS route update is then used by the operational BGW routers to route data traffic. However, if the AS route update from the remote AS is determined by the BGW controller 110 to be problematic, the BGW controller 110 may designate the AS route update as being unsuitable for deployment into the one or more operational BGW routers of the AS 102. Further, the corresponding routing paths of the problematic AS route updates may be stored in a database for future reference.

The BGW controller 110 of the AS 102 may take one or more actions against a remote AS, such as the remote AS 116, that recurrently surfaces problematic AS route updates to the AS 102. In some embodiments, the BGW controller 110 may determine whether the number of problematic AS route updates received from the remote AS in a predetermined time period exceeds a numerical threshold. Thus, the BGW controller 110 may take one or more actions against the remote AS when the numerical threshold is exceeded. In one instance, the BGW controller 110 may prune the remote AS from one or more data traffic routing paths used by the AS 102 by passing the data traffic through one or more alternative ASs. In another instance, the BGW controller 110 may exclude the remote AS from future data traffic routing paths generated by the AS 102 for promulgation to peer ASs, such as the peer ASs 112(1)-112(M). In an additional instance, the BGW controller 110 may report the remote AS as a problematic AS to one or more peer ASs. Alternatively, or currently, the BGW controller 110 may report the remote AS as a problematic AS to online reporting portals of governmental regulatory agencies and/or law enforcement agencies.

In additional embodiments, the BGW controller 116 may configure the isolated BGW router 108 to exhibit different sets of one or more BGW router vulnerabilities at different periods of time. The BGW controller 116 may monitor problematic routing updates to determine the amount of problematic AS route updates that are attracted by each set of BGW router vulnerabilities. Accordingly, the BGW controller 116 may generate statistics that rank the sets of vulnerabilities based on the number of problematic AS route updates attracted by each set. The statistics may also correlate specific remote ASs that injected the problematic AS route updates with particular sets of BGW router vulnerabilities. In this way, the statistics may assist network engineers with prioritizing one or more vulnerabilities for monitoring and/or remediation as well as identifying ASs as being habitual offenders.

Furthermore, an administrator of the AS 102 may use the dashboard 120 to interface with the BGW controller 110. In some instances, the administrator may use the dashboard 120 to request the generation of statistical reports with respect to problematic AS route updates or remote ASs. In other instances, the dashboard 120 may provide controls for manually designating an AS route update as problematic or canceling such a designation for an AS route update. In additional instances, the controls of the dashboard 120 may enable the administrator to manually prune a remote AS from or add the remote AS to one or more data traffic routing paths used by the AS 102, manually exclude the remote AS from or include the remote AS in future data traffic routing paths generated by the AS 102 for promulgation to peer ASs, and/or manually report the remote AS as a problematic AS to one or more entities.

Example BGW Controller Components

Figure 2:
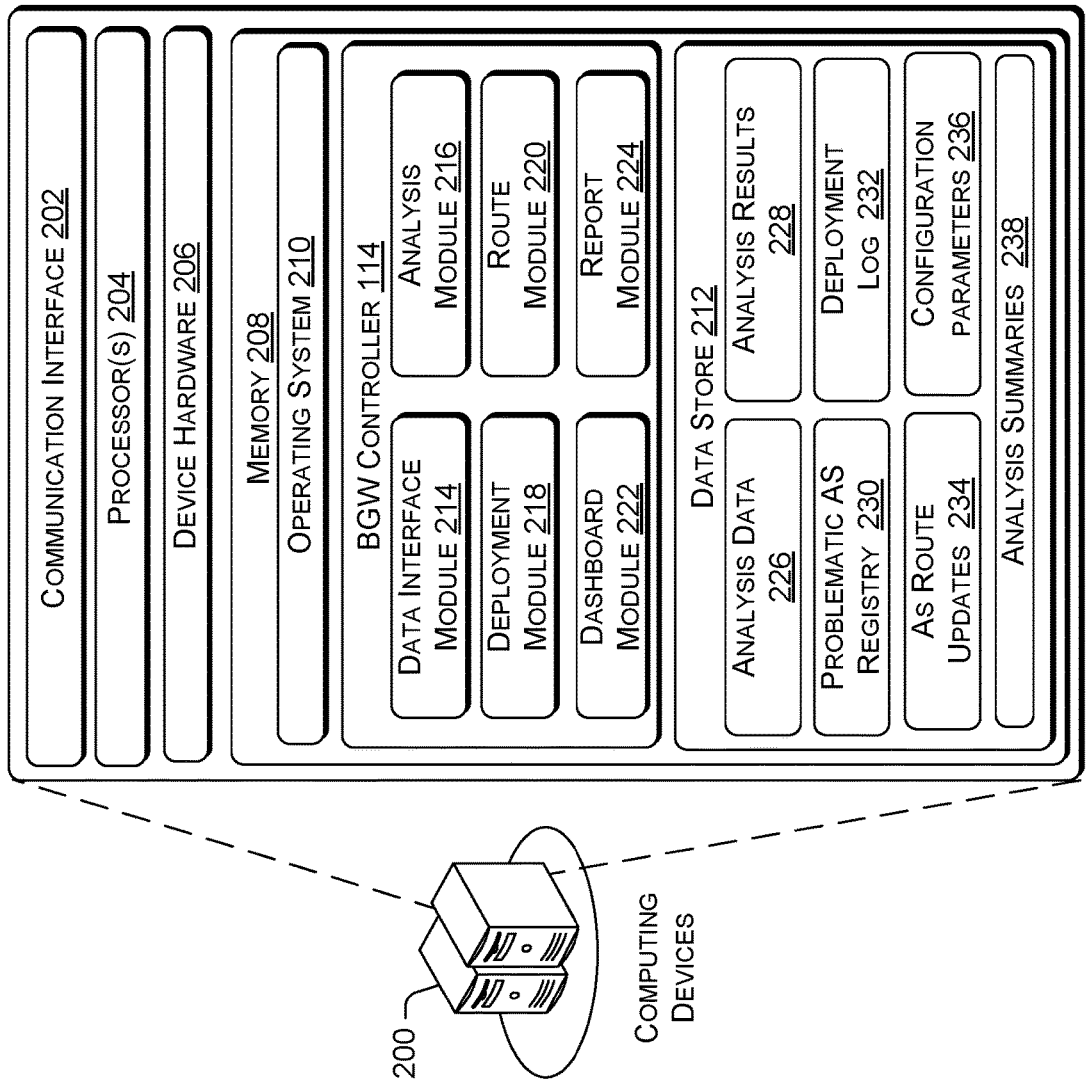
FIG. 2 is a block diagram showing various components in a border gateway (BGW) controller of an AS that performs problematic AS route update detection.

FIG. 2 is a block diagram showing various components in a BGW controller of an AS that performs problematic AS route update detection. The BGW controller may be implemented via one or computing devices 200. The computing devices 200 may include general purpose computers, servers, or other electronic devices that are capable of receiving input, processing the input, and generating output data. In other embodiments, the computing devices 200 may be virtual computing devices in the form of virtual machines or software containers that are hosted in a cloud.

The computing devices 200 may include a communication interface 202, one or more processors 204, device hardware 206, and memory 208. The communication interface 202 may include wireless and/or wired communication components that enable the computing devices to transmit data to and receive data from other networked devices via the wireless communication network 102 and/or an additional network. For example, the additional network may be a local area network (LAN), a larger network such as a wide area network (WAN), or a collection of networks, such as the Internet. The device hardware 206 may include additional hardware that performs user interface, data display, data communication, data storage, and/or other server functions.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital storage disks or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The processors 204 and the memory 208 of the computing devices 200 may implement an operating system 210 and the BGW controller 110. The operating system 210 may include components that enable the computing devices 200 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system. The memory 208 may further contain a data store 212 for storing data used by the BGW controller 110.

The BGW controller 110 may include a data interface module 214, an analysis module 216, a deployment module 218, a route module 220, a dashboard module 222, and a report module 224. These modules may include routines, program instructions, objects, and/or data structures that perform particular tasks or implement particular abstract data types. In some embodiments, the data interface module 214 may check for and retrieve data from multiple data sources, such as the data sources 118 in response to requests from the analysis module 216. In other embodiments, the data interface module 214 may use a scheduler to check for and retrieve data from the multiple data sources. The scheduler may perform the checking and retrieval based on configurable policies. For example, a configurable policy may specify the source data location, frequency of data retrieval, data retention period, and data disposal date/time. In various embodiments, the data interface module 214 may employ data adapters to obtain data files from the data sources. The data adapters may use file transfer protocol (FTP), Hypertext Transfer Protocol (HTTP) posts, direct network infrastructure element connection, and/or other data transfer protocols to retrieve the data files from the data sources. The data may be in the form of JavaScript Object Notation (JSON) records, Structured Query Language (SQL) records, and/or so forth.

In some embodiments, the data interface module 214 may perform data integrity tests to verify the integrity of the received data files. In some instances, the data files that are received by the data interface module 214 may contain encrypted data. Accordingly, the data interface module 214 may use an asymmetric or symmetric encryption algorithm to decrypt the data. The data interface module 214 may further merge data from multiple data files, such that the merged data may be fed into other modules for analysis.

The data interface module 214 may also receive AS route updates from isolated BGW routers of the AS 102, such as the isolated BGW router 108. In some embodiments, the data interface module 214 may obtain the AS route updates from an isolated BGW router by calling an application program interface (API) provided by the software of the isolated BGW router. In other embodiments, the isolated BGW router may be configured to export the AS route updates to the data interface module 214 by via an API of the data interface module 214.

The analysis module 216 may perform analysis of the AS route updates to determine whether the AS route updates are problematic or valid. In various embodiments, the analysis performed by the analysis module 216 may include network topology analysis, pattern matching analysis, statistical analysis, and/or so forth. The analysis may be performed based on the data received from the data source 118. In some embodiments, the analysis module 216 may store the data that are used for performing the analyses of the AS route updates as analysis data 226 in the data store 212. Further, the analysis module 216 may store the analysis results 228 of the performed analyses, e.g., the validity of the AS route updates, in the data store 212.

In some embodiments, the analysis module 216 may designate a remote AS as a problematic AS when the number of problematic AS route updates received from the remote AS exceeds a numerical threshold. Accordingly, the analysis module 216 may maintain a problematic AS registry 230 in the data store 212 for storing the identities of the problematic ASs. In some instances, the analysis module 216 may remove the identity of a remote AS from the problematic AS registry 230 when the isolated BGW router does not receive problematic AS route updates from the remote AS for a predetermined period of time.

The deployment module 218 may be directed by the analysis module 216 to deploy valid AS route updates to the operational BGW routers, such as the BGW routers 106(1)-106(K). The deployment module 218 is also capable of reversing an AS route update that is implemented to one or more operational BGW routers, so that the deployment module 218 may restore a previously AS data traffic routing path to the one or more operational BGW routers in a rollback operation. Accordingly, the deployment module 218 may maintain a deployment log 232 of AS route updates that are deployed to each operational BGW router in the data store 212. In some instances, the deployment module 318 may be directed by the analysis module 216 to perform a trial deployment of an AS route update to an operational BGW router in order to analyze the validity of the AS route update.

The route module 220 may generate AS route updates 234 for distribution to other ASs, such as the peer ASs 112(1)-112(M). The AS route updates may be generated based on multiple configuration parameters 236, such as the operational costs of networks or links between ASs, the performance, status, security, and/or capabilities of those networks or links, the topology of the ASs (e.g., geographical locations, distances between ASs, links to other ASs, etc.), the performance guarantees made by the AS 102 to customers, and/or so forth. In some embodiments, the route module 220 may be directed by the analysis module 216 to take action against a problematic AS. For example, the route module 220 may prune the problematic AS from one or more data traffic routing paths used by the AS by passing the data traffic through one or more alternative ASs. In another example, the route module 220 may exclude the remote AS from future data traffic routing paths that are generated for promulgation to peer ASs.

The dashboard module 222 may generate the dashboard 120 for presentation to an administrator via a user device. In some embodiments, the dashboard 120 may be an online portal (e.g., a website) that is accessible via a web browser installed on a remote user device. In other embodiments, the dashboard 120 may be an online service that is accessible via a dedicated application installed on a remote user device. The dashboard 120 may be used to generate analysis summaries 238 regarding problematic AS route updates and problematic ASs. For example, the analysis summaries 238 may detail the number or percentage of problem ASs that are received from a remote AS in a specific time period, the total number of problematic AS route updates received in a particular time period, a geographical location summary of problematic AS route updates or problematic ASs, and/or so forth.

In some instances, the controls of the dashboard 120 may enable an administrator to manually add or remove a remote AS from the problematic AS registry 230. In other instances, the controls of the dashboard 120 may enable the administrator to manually reverse an AS route update that is implemented to one or more operational BGW routers using the deployment log 232. In additional instances, the controls of the dashboard 120 may enable the administrator to manually designate an AS route update as problematic or cancel such a designation for an AS route update to manually prune the remote AS from or add the remote AS to one or more data traffic routing paths used by the AS 102, and/or manually exclude the remote AS from or include the remote AS in future data traffic routing paths generated by the AS 102 for promulgation to peer ASs.

The report module 224 may periodically report the identities of problematic ASs to peer ASs, such as peer ASs 112(1)-112(M). Conversely, the report module 224 may also receive identities of problematic ASs from a peer AS and store the identities in the problematic AS registry 230. The report module 224 may send and receive such information by interface with the BGW controllers present on the peer ASs. For example, the BGW controllers may use a common interface protocol, e.g., BGP, to exchange information between the BGW controllers via a communication network, such as the Internet. In some embodiments, the report module 224 may automatically upload the identities of the problematic ASs to online reporting portals of governmental regulatory agencies and/or law enforcement agencies. In other embodiments, the dashboard 120 may provide controls that are used by the administrator to manually activate the reporting functionalities of the report module 224.

The data store 212 may store data that are processed or generated by the BGW controller 110. The data store 212 may include one or more databases, such as relational databases, object databases, object-relational databases, and/or key-value databases that store data. For example, data stored in the data store 212 may include the analysis data 226, the analysis results 228, the problematic AS registry 230, the deployment log 232, the AS route updates 234, the configuration parameters 236, the analysis summaries 238, and/or other data.

Example Processes

Figure 3:
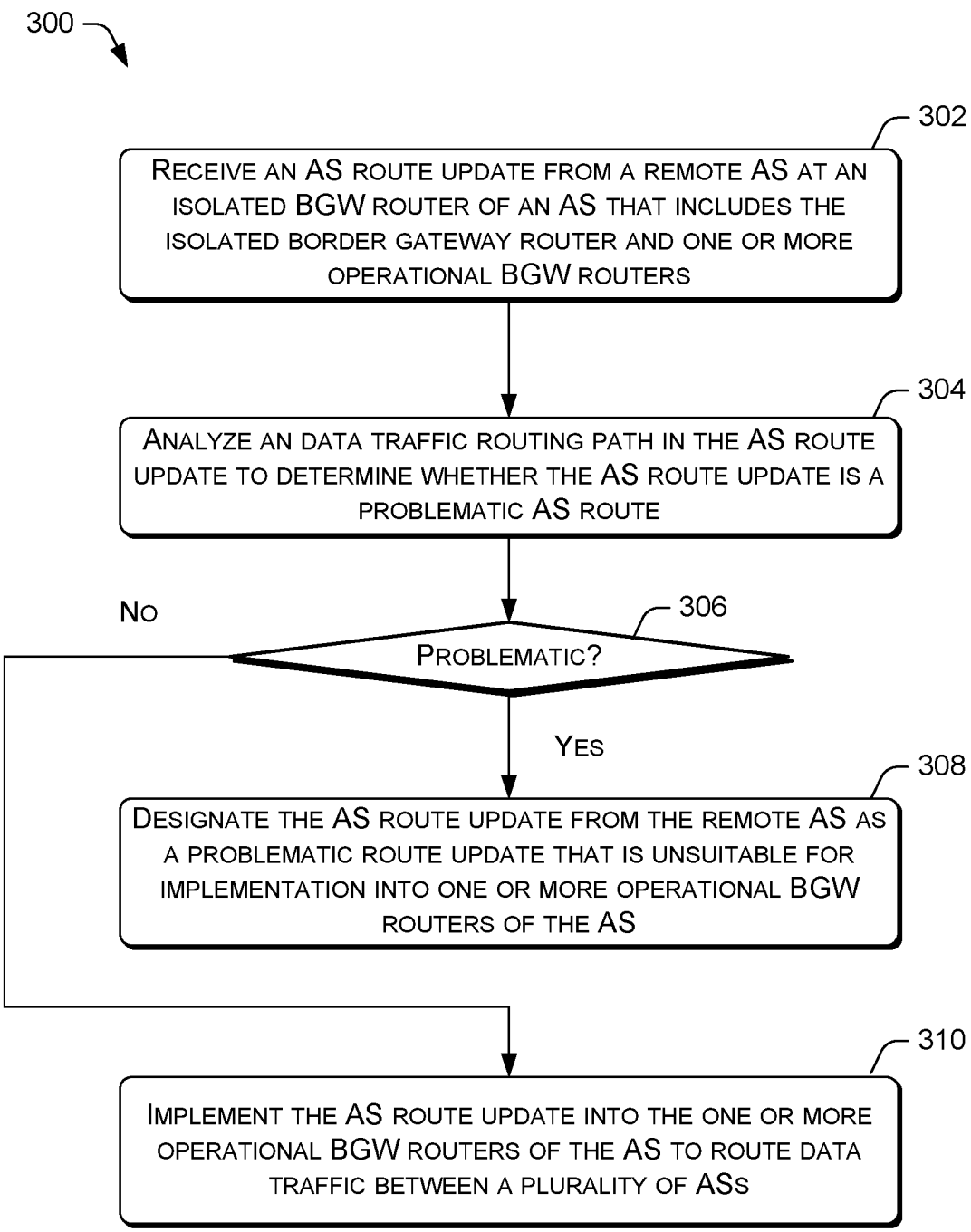
FIG. 3 is a flow diagram of an example process for designating an AS route update received from a remote AS as a problematic or a non-problematic update.
Figure 4:
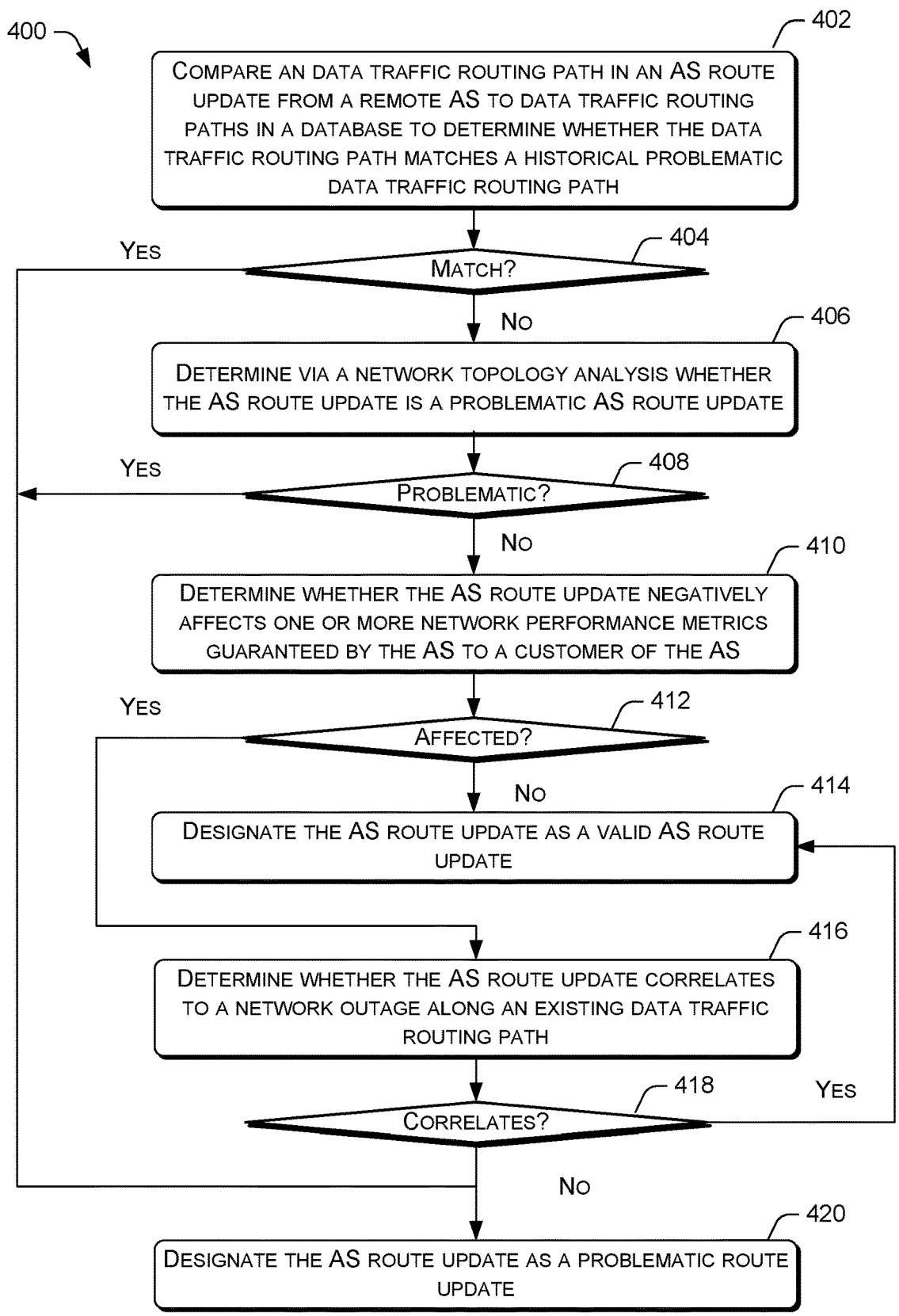
FIG. 4 is a flow diagram of an example process for determining whether an AS route update received from a remote AS is a problematic or a non-problematic update.
Figure 5:
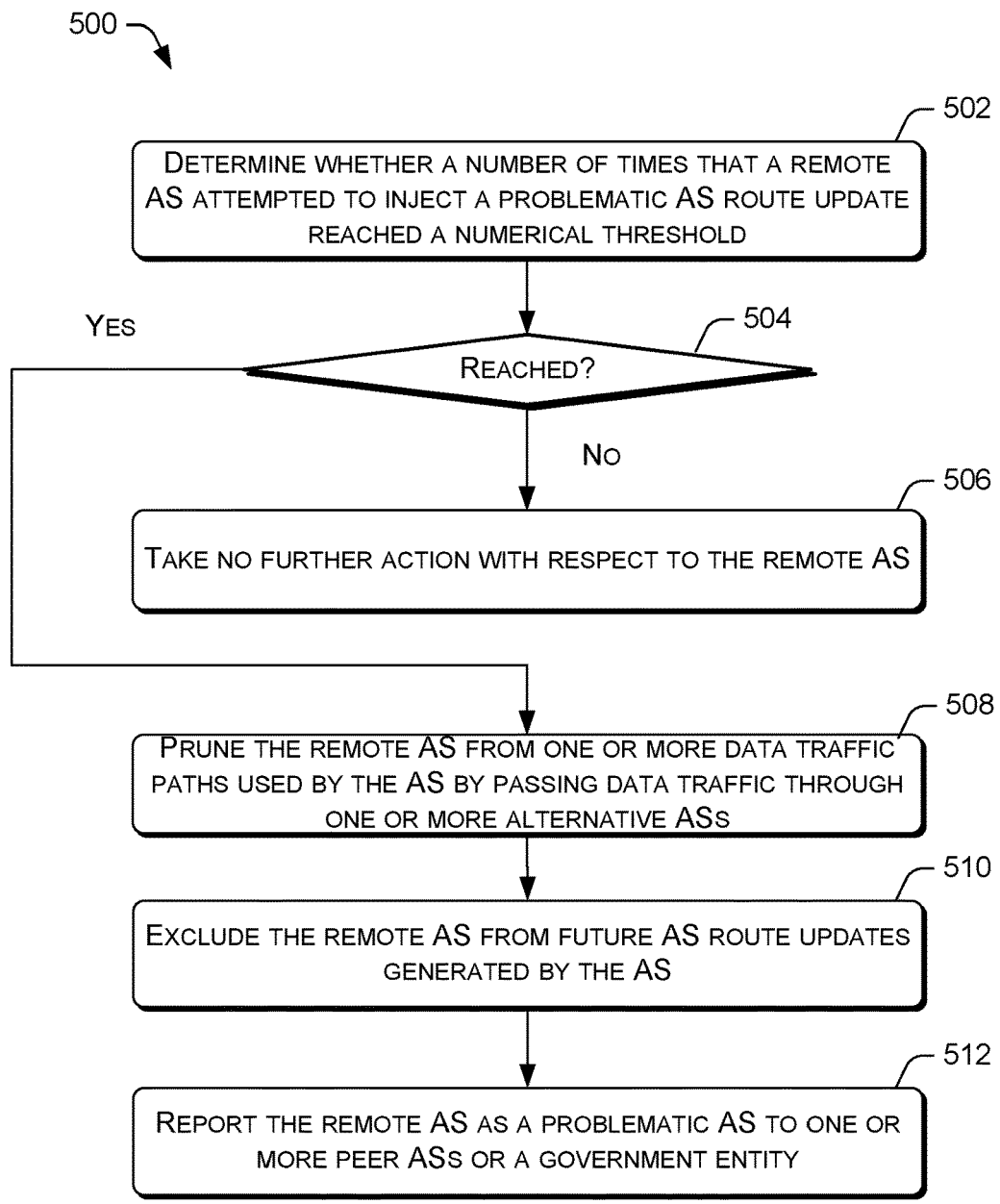

FIGS. 3-5 present illustrative processes 300-500 for implementing an example architecture of an autonomous system (AS) that supports the detection of problematic AS route updates. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-500 are described with reference to the architecture 100 of FIG. 1.

FIG. 3 is a flow diagram of an example process 300 for designating an AS route update received from a remote AS as a problematic or non-problematic update. At block 302, the AS 102 may receive an AS route update from a remote AS at an isolated BGW router of the AS 102. The AS 102 may include the isolated BGW router and one or more operational BGW routers. Unlike an operational BGW router of the AS 102, the isolated BGW router is a BGW router that is not configured to participate in the routing of data traffic between the AS 102 and other ASs. Instead, the isolated BGW router is configured to receive AS route updates from other ASs and send the AS route updates to the BGW controller 110 of the AS 102 for analysis. Conversely, operational BGW routers 106(1)-106(K) of the AS 102 are configured to not directly accept AS route updates from other ASs, but route data traffic between the AS 102 and the other ASs.

At block 304, the AS 102 may analyze the data traffic routing path in the AS route update to determine whether the route update is a problematic route update. In various embodiments, the BGW controller 110 of the AS 102 may make such a determination using one or more analytic techniques. For example, the analysis techniques that are employed by the BGW controller 110 may include network topology analysis, pattern matching analysis, statistical analysis, and/or so forth.

At decision block 306, if the AS route update is determined to be a problematic route update, the process 300 may proceed to block 308. At block 308, the BGW controller 110 of the AS 102 may designate the AS route update from the remote AS as a problematic update that is unsuitable for implementation into one or more operational BGW routers of the AS 102. However, if the AS route update is determined to be a valid, i.e., non-problematic AS route update, the process 300 may proceed to block 310. At block 310, the BGW controller 110 of the AS 102 may implement the AS route update into the one or more operational BGW routers of the AS 102 to route data traffic between a plurality of ASs.

FIG. 4 is a flow diagram of an example process 400 for determining whether an AS route update received from a remote AS is a problematic or non-problematic update. The process 400 further describes block 304 of the process 300. At block 402, the BGW controller 110 of the AS 102 may compare a data traffic routing path in an AS route update from a remote AS to data traffic routing paths in a database to determine whether the data traffic routing path matches a historical problematic data traffic routing path. At decision block 404, if the BGW controller 110 determines that the data traffic routing path does not match the historical problematic data traffic routing path, the process may proceed to block 406.

At block 406, the BGW controller 110 may determine via a network topology analysis whether the AS route update is a problematic AS route update. For example, a topology analysis of the AS route update may identify a corresponding data traffic routing path as routing traffic to the AS 102 in a suboptimal fashion. In another example, a data traffic routing path or a routing path segment of the AS route update may be determined to be problematic because it passes through one or more AS that are designated as being operated by known malicious actors.

At decision block 408, if the BGW controller 110 determines that the AS route update is a valid, i.e., non-problematic AS route update, the process 400 may proceed to block 410. At block 410, the BGW controller 110 may determine whether the AS route update negatively affects one or more network performance metrics guaranteed by the AS 102 to a customer entity of the AS 102. For example, the metrics may include a data throughput requirement, a response latency requirement, a maximum allowable data packet loss requirement, etc. A performance metric is negatively affected if the metric is unable to be met as a result of the AS route update. At block 412, if the BGW controller 110 determines that the network performance metrics guaranteed by the AS 102 are not affected, the process 400 may proceed to block 414. At block 414, the BGW controller 110 may designate the AS route update as a valid, i.e., non-problematic AS route update.

However, if the BGW controller 110 determines that at least one of the network performance metrics guaranteed by the AS is affected, the process may proceed to block 416. At block 416, the BGW controller 110 may determine whether the AS route update correlates to an outage along an existing data traffic routing path. For example, the data traffic routing path proposed by an AS route update may correlate to a bypass of a severed fiber optics link between two ASs. At decision block 418, if the AS route update correlates to an outage, the process 400 may loop to block 414, so that the AS route update is designated as valid. However, if the AS route update fails to correlate to an outage, the process 400 may proceed to block 420. At block 420, the BGW controller 110 may designate the AS route update as a problematic route update.

Returning to decision block 404, if the BGW controller 110 determines that the data traffic routing path of the AS route update does match a historical problematic data traffic routing path, the process 400 may proceed directly to block 420. Likewise, returning to decision block 408, if the BGW controller 110 determines that the AS route update is a problematic AS route update, the process 400 may proceed directly to block 420.

FIG. 5 is a flow diagram of an example process 500 for performing various remedial actions when a remote AS is determined to be a problematic AS. At block 502, the BGW controller 110 may determine whether a number of times that a remote AS attempted to inject a problematic AS route reached a numerical threshold. At decision block 504, if the number of times did not reach the numerical threshold, the process 500 may proceed to block 506. At block 506, the BGW controller 110 may take no further action with respect to the remote AS. However, if the number of times does reach the numerical threshold, the BGW controller 110 may perform one of the of the blocks 508-512. At block 508, the BGW controller 110 may prune the remote AS from one or more data traffic paths used by the AS 102 by passing data traffic through one or more alternative ASs. At block 510, the BGW controller 110 may exclude the remote AS from future AS route updates generated by the AS 102. At block 512, the BGW controller 110 may report the remote AS as a problematic AS to one or more peer ASs or a government entity.

The use of an isolated BGW router enables an AS to determine whether an AS route update received from a remote AS is problematic prior to implementing the routing data into operation. Accordingly, the use of the isolated BGW router may protect the AS from malicious or erroneous routing path configurations that cause network performance degradation and outages.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   receiving an Autonomous System (AS) route update from a remote AS at an isolated border gateway (BGW) router of an AS, the AS including the isolated BGW router and one or more operational BGW routers;
   analyzing a data traffic routing path in the AS route update received by the isolated BGW router to determine whether the AS route update is a problematic update, the data traffic routing path for routing data traffic through a plurality of ASs that include the AS;
   in response to determining that the AS route update is a non-problematic update, implementing the AS route update into the one or more operational BGW routers of the AS to route the data traffic between the plurality of ASs; and
   in response to determining that the AS route update is a problematic update, designating the AS route update from the remote AS as unsuitable for implementing into the one or more operational BGW routers of the AS, and performing at least one of:
      pruning the remote AS from one or more existing data traffic routing paths used by the AS by routing data traffic through an alternative AS;
      excluding the remote AS from one or more AS route updates generated by the AS for implementation by one or more peer ASs of the AS; or
      reporting the remote AS as a problematic AS to the one or more peer ASs of the AS or a government entity.

2. The one or more non-transitory computer-readable media of claim 1, wherein the acts further comprising, in response to determining that an amount of problematic AS route updates sent by the remote AS to the AS exceeds a threshold, performing at least one of:
   pruning the remote AS from one or more existing data traffic routing paths used by the AS by routing data traffic through an alternative AS;
   excluding the remote AS from one or more AS route updates generated by the AS for implementation by one or more peer ASs of the AS; or
   reporting the remote AS as a problematic AS to the one or more peer ASs of the AS or a government entity.

3. The one or more non-transitory computer-readable media of claim 1, wherein the analyzing includes determining that the data traffic routing path in the AS route update is the problematic data traffic routing path when:
   the data traffic routing path matches a routing pattern of a historical problematic data traffic routing path stored in a database of problematic data traffic routing paths;
   the data traffic routing path is determined via a network topology analysis to contain a malicious routing configuration that is configured to enable a malicious AS to at least one of blackhole, intercept, or duplicate the data traffic; or the data traffic routing path causes a routing of the data traffic for a customer entity to fail to meet one or more network performance metrics guaranteed by the AS to the customer entity.

4. The one or more non-transitory computer-readable media of claim 3, wherein the acts further comprise storing the data traffic routing path as a problematic data traffic routing path in the database of problematic data traffic routing paths.

5. The one or more non-transitory computer-readable media of claim 1, wherein the problematic update includes a malicious data traffic routing path or an accidental data traffic routing path misconfiguration.

6. The one or more non-transitory computer-readable media of claim 1, wherein the data traffic routing path in the AS route update modifies an existing data traffic routing path by at least one of removing one or more ASs used in the existing data traffic routing path or adding one or more ASs to the existing data traffic routing path.

7. The one or more non-transitory computer-readable media of claim 1, wherein the analyzing includes determining that the AS route update is a non-problematic update when at least one routing path segment of an existing data traffic routing path updated by the AS route update is out of service.

8. The one or more non-transitory computer-readable media of claim 1, wherein the analyzing includes determining that the AS route update is a non-problematic update when the AS route update correlates to an outage along an existing data traffic routing path, despite the data traffic routing path causing data traffic routing for a customer entity to fail to meet one or more network performance metrics guaranteed by the AS to the customer entity.

9. The one or more non-transitory computer-readable media of claim 1, wherein the isolated BGW router includes one or more vulnerabilities that attract one or more AS route updates from a malicious AS.

10. A computer-implemented method, comprising:
  receiving, at an Autonomous System (AS), an AS route update from a remote AS at an isolated BGW router of an AS, the AS including the isolated BGW router and one or more operational BGW routers;
  analyzing, at the AS, a data traffic routing path in the AS route update received by the isolated BGW router to determine whether the AS route is a problematic AS route, the data traffic routing path for routing data traffic through a plurality of ASs that include the AS;
  in response to determining that the AS route update is a non-problematic update, implementing the AS route update into the one or more operational BGW routers of the AS to route the data traffic between the plurality of ASs;
  in response to determining that the AS route update is a problematic update, designating the AS route update from the remote AS as unsuitable for implementing into the one or more operational BGW routers of the AS; and
  In response to determining that an amount of problematic AS route updates sent by the remote AS to the AS exceeds a threshold, performing at least one of:
    pruning the remote AS from one or more existing data traffic routing paths used by the AS by routing data traffic through an alternative AS;
    excluding the remote AS from one or more AS route updates generated by the AS for implementation by one or more peer ASs of the AS; or
    reporting the remote AS as a problematic AS to the one or more peer ASs of the AS or a government entity.

11. The computer-implemented method of claim 10, wherein the analyzing includes determining that the data traffic routing path in the AS route update is the problematic data traffic routing path when:
  the data traffic routing path matches a routing pattern of a historical problematic data traffic routing path stored in a database of problematic data traffic routing paths;
  the data traffic routing path is determined via a network topology analysis to contain a malicious routing configuration that is configured to enable a malicious AS to at least one of blackhole, intercept, or duplicate the data traffic; or
  the data traffic routing path causes a routing of the data traffic for a customer entity to fail to meet one or more network performance metrics guaranteed by the AS to the customer entity.

12. The computer-implemented method of claim 10, wherein the problematic update includes a malicious data traffic routing path or an accidental data traffic routing path misconfiguration.

13. The computer-implemented method of claim 10, wherein the data traffic routing path in the AS route update modifies an existing data traffic routing path by at least one of removing one or more ASs used in the existing data traffic routing path or adding one or more ASs to the existing data traffic routing path.

14. An Autonomous System (AS), comprising:
  one or more processors; and
  memory including a plurality of computer-executable components that are executable by the one or more processors to perform a plurality of actions, the plurality of actions comprising:
    receiving an AS route update from a remote AS at an isolated border gateway (BGW) router of an AS, the AS including the isolated BGW router and one or more operational BGW routers;
    analyzing a data traffic routing path in the AS route update received by the isolated BGW router to determine whether the AS route update is a problematic update, the data traffic routing path for routing data traffic through a plurality of ASs that include the AS;
    in response to determining that the AS route update is a non-problematic update when the AS route update correlates to an outage along an existing data traffic routing path, despite the data traffic routing path causing data traffic routing for a customer entity to fail to meet one or more network performance metrics guaranteed by the AS to the customer entity, implementing the AS route update into the one or more operational BGW routers of the AS to route the data traffic between the plurality of ASs; and
    in response to determining that the AS route update is a problematic update, designating the AS route update from the remote AS as unsuitable for implementing into the one or more operational BGW routers of the AS.

15. The AS of claim 14, wherein the plurality of actions further comprise in response to determining that an amount of problematic AS route updates sent by the remote AS to the AS exceeds a threshold, performing at least one of:
  pruning the remote AS from one or more existing data traffic routing paths used by the AS by routing data traffic through an alternative AS;

excluding the remote AS from one or more AS route updates generated by the AS for implementation by one or more peer ASs of the AS; or reporting the remote AS as a problematic AS to the one or more peer ASs of the AS or a government entity.

16. The AS of claim 14, wherein the analyzing including determining that the data traffic routing path in the AS route update is the problematic data traffic routing path when:

the data traffic routing path matches a routing pattern of a historical problematic data traffic routing path stored in a database of problematic data traffic routing paths;

the data traffic routing path is determined via a network topology analysis to contain a malicious routing configuration that is configured to enable a malicious AS to at least one of blackhole, intercept, or duplicate the data traffic; or the data traffic routing path causes a routing of the data traffic for a customer entity to fail to meet one or more network performance metrics guaranteed by the AS to the customer entity.

17. The AS of claim 14, wherein the analyzing includes determining that the AS route update is a non-problematic update when an existing data traffic routing path updated by the AS route update is out of service.

18. The computer-implemented method of claim 10, wherein the data traffic routing path in the AS route update modifies an existing data traffic routing path by at least one of removing one or more ASs used in the existing data traffic routing path or adding one or more ASs to the existing data traffic routing path.

19. The computer-implemented method of claim 10, wherein the analyzing includes determining that the AS route update is a non-problematic update when at least one routing path segment of an existing data traffic routing path updated by the AS route update is out of service.

20. The computer-implemented method of claim 10, wherein the analyzing includes determining that the AS route update is a non-problematic update when the AS route update correlates to an outage along an existing data traffic routing path, despite the data traffic routing path causing data traffic routing for a customer entity to fail to meet one or more network performance metrics guaranteed by the AS to the customer entity.

* * * * *